United States Patent
Chen

(10) Patent No.: US 6,236,578 B1
(45) Date of Patent: May 22, 2001

(54) POWER SUPPLY WHICH CAN CONVERT AN OSCILLATING VOLTAGE INTO A VARIABLE STEADY STATE VOLTAGE

(75) Inventor: Chi-Jen Chen, Taoyuan (TW)

(73) Assignee: Acer Peripherals Inc., Taoyuan (TW)

( * ) Notice: Subject to any disclaimer, the term of this patent is extended or adjusted under 35 U.S.C. 154(b) by 0 days.

(21) Appl. No.: 09/614,565

(22) Filed: Jul. 12, 2000

(30) Foreign Application Priority Data

Jan. 5, 2000 (TW) ................................................ 089100120

(51) Int. Cl.$^7$ .................................................. H02M 3/335
(52) U.S. Cl. ................................. 363/21.01; 363/21.07; 363/21.15
(58) Field of Search .................................. 363/20, 21.01, 363/21.02, 21.07, 21.15, 95, 97, 131

(56) References Cited

U.S. PATENT DOCUMENTS 4,316,242 * 2/1982 Colangelo et al ........................ 363/21
5,629,841 * 5/1997 Attwood .................................. 363/21
5,675,485 * 10/1997 Seong ...................................... 363/97
5,914,865 * 6/1999 Barbehenn et al. .................... 363/21

* cited by examiner

*Primary Examiner*—Matthew Nguyen
(74) *Attorney, Agent, or Firm*—Winston Hsu

(57) ABSTRACT

A power supply for converting an inputted oscillating voltage into an outputted steady state voltage. The power supply includes a voltage converting circuit for converting the inputted oscillating voltage into a first steady state voltage, a transformer for transforming the first steady state voltage into a second oscillating voltage, a pulse generator for generating a pulse signal so as to control on and off of the transformer, a rectifying circuit for rectifying the second oscillating voltage so as to generate the outputted steady state voltage, and a feedback circuit for controlling a duty cycle of the pulse signal according to the outputted steady state voltage and an output voltage generated by a variable power source so that the outputted steady state voltage generated by the power supply can be controlled by the variable power source.

9 Claims, 2 Drawing Sheets

US 6,236,578 B1

POWER SUPPLY WHICH CAN CONVERT AN OSCILLATING VOLTAGE INTO A VARIABLE STEADY STATE VOLTAGE

BACKGROUND OF THE INVENTION

1. Field of the Invention

The invention relates to a power supply, and more particularly, to a power supply which can convert an oscillating voltage into a variable steady state voltage.

2. Description of the Prior Art

Please refer to FIG. 1. FIG. 1 is a perspective view of a prior art power supply 10. The power supply 10 is used for converting an oscillating voltage 12 into a steady state voltage which is then outputted to a display device 16 through an output port 14. The power supply 10 comprises a voltage converting circuit 18, a transformer 22, a pulse generator 26, a light coupling device 36, a rectifying circuit 30 and a feedback circuit 34.

The voltage converting circuit 18 comprises a bridge circuit 38 and a filter 40 for rectifying the oscillating voltage 12 into a first steady state voltage. The transformer 22 has an input end 20, an output end 24 and a control end 28. The input end 20 is electrically connected to an output end 42 of the voltage converting circuit 18. The transformer 22 is used for transforming the first steady state voltage at the input end 20 into a second oscillating voltage at the output end 24. The control end 28 is used for controlling on and off of the transformer 22. The pulse generator 26 has an output end 44 and a control end 46. The output end 44 is electrically connected to the control end 28 of the transformer 22. The pulse generator 26 is used for generating a pulse signal at the output end 44 so as to control the on and off of the transformer 22. The control end 46 is used for controlling a duty cycle of the pulse signal. The rectifying circuit 30 has an input end 32 electrically connected to the output end 24 of the transformer 22 for rectifying the second oscillating voltage so as to generate the steady state voltage at the output port 14 of the power supply 10.

The feedback circuit 34 has an input end 50, a control end 56 and an output end 52. The input end 50 is electrically connected to the output end 48 of the rectifying circuit 30. The light coupling device 36 is electrically connected between the output end 52 of the feedback circuit 34 and the control end 46 of the pulse generator 26 for isolating the current between the output end 52 of the feedback circuit 34 and the control end 46 of the pulse generator 26. The feedback circuit 34 comprises a comparator 54 for comparing the voltage at the control end 56 with a predetermined voltage so as to generate a control signal, and a variable resistor 58 for fixing errors caused by other resistive components.

When the voltage at the control end 56 is higher than the predetermined voltage, the impedance of the comparator 54 will drop thus grounding the output end 52, turning on the light coupling device 36, and generating an offset voltage at the control end 46 of the pulse generator 26. When detecting the offset voltage, the pulse generator 26 will gradually reduce the duty cycle of the pulse signal generated at the output end 44. When the voltage at the control end 56 is lower than the predetermined voltage, the impedance of the comparator 54 will increase thus turning off the light coupling device 36 and grounding the control end 46 of the pulse generator 26. And the pulse generator 26 will gradually increase the duty cycle of the pulse signal generated at its output end 44.

The feedback circuit 34 can control the pulse generator 26 to sustain the steady state voltage at the output port 14 at only one fixed voltage, and the power supply 10 has no component to change the steady state voltage. Therefore, the power supply 10 can not generate different steady state voltages for different display devices.

SUMMARY OF THE INVENTION

It is therefore a primary objective of the present invention to provide a power supply to solve the aforementioned problem.

According to the claimed invention, the power supply can convert an inputted oscillating voltage into an outputted steady state voltage. The power supply comprises a feedback circuit having a first input end electrically connected to the outputted steady state voltage and a second input end electrically connected to a variable power source. By controlling the variable power source, the outputted steady state voltage can be varied.

It is an advantage of the present invention that the outputted steady state voltage can be controlled by the variable power source so that the power supply can generate different steady state voltages for different display devices.

These and other objects and the advantages of the present invention will no doubt become obvious to those of ordinary skill in the art after having read the following detailed description of the preferred embodiment, as illustrated by the included figures and drawings.

DETAILED DESCRIPTION OF THE PREFERRED EMBODIMENT

Figure 1:
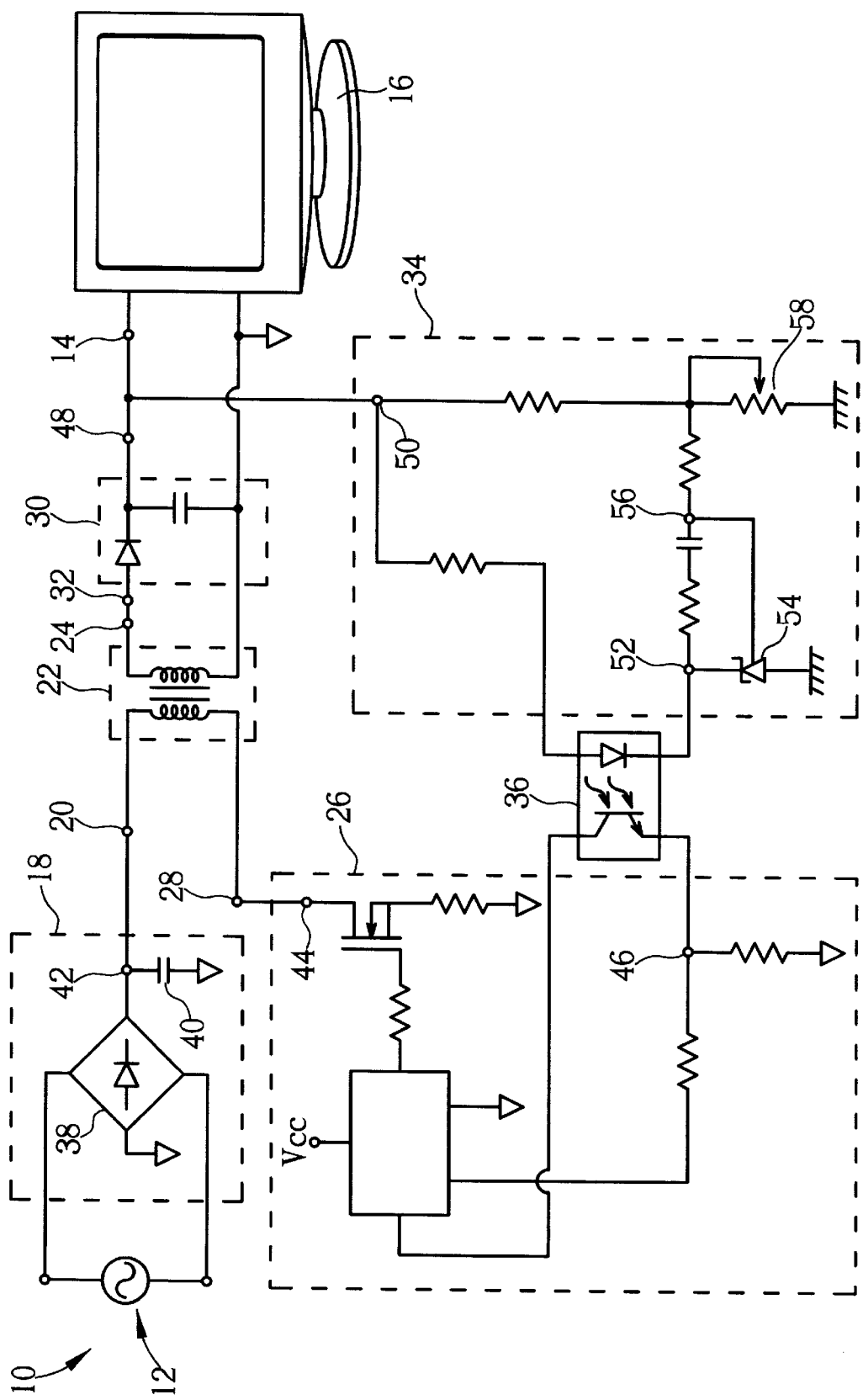
FIG. 1 is a perspective view of a prior art power supply.
Figure 2:
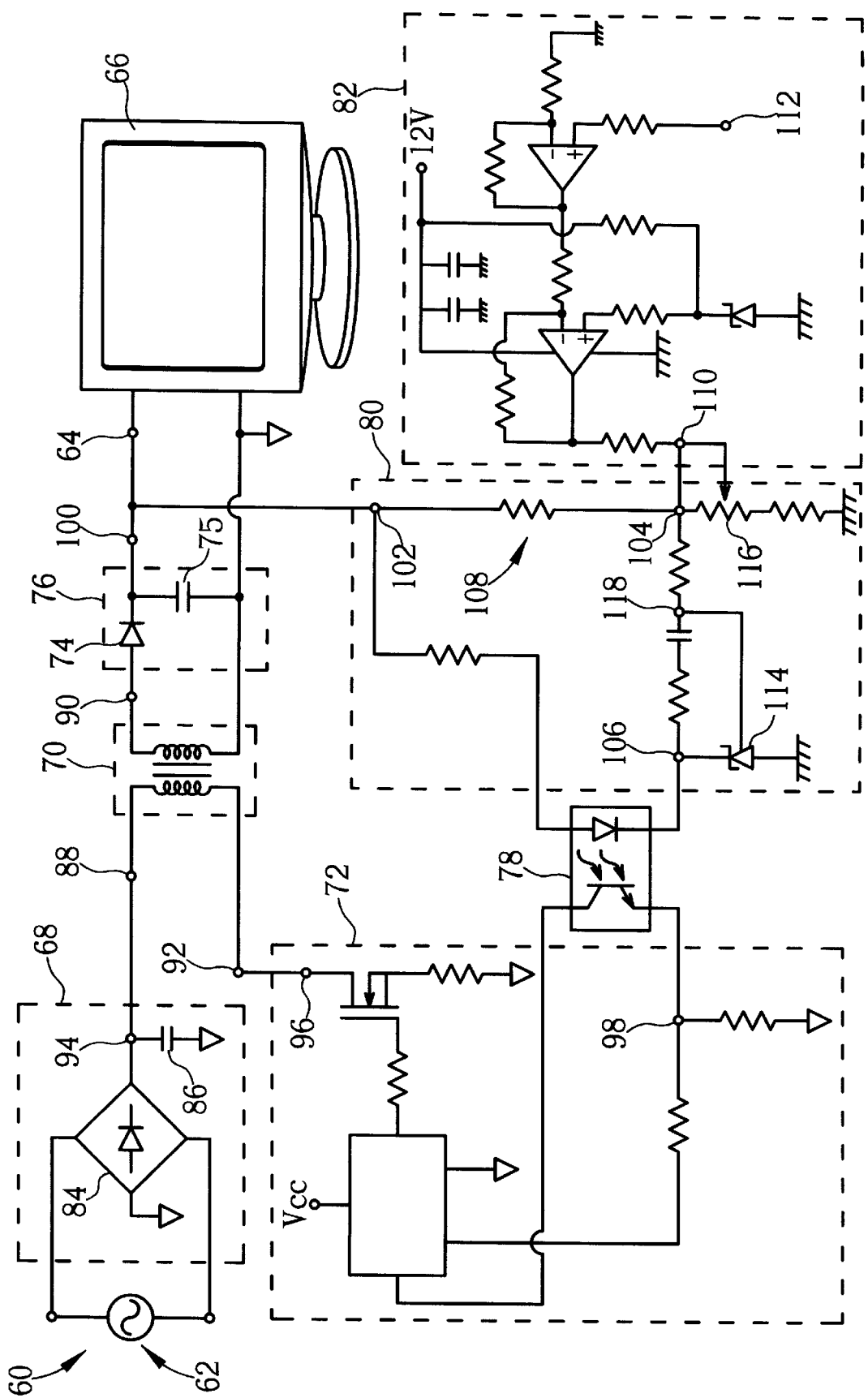
FIG. 2 is a perspective view of a power supply according to the present invention.

Please refer to FIG. 2. FIG. 2 is a perspective view of a power supply 60 according to the present invention. The power supply 60 is used for converting an oscillating voltage 62 into a steady state voltage which is then outputted to a display device 66 through an output port 64. The power supply 60 comprises a voltage converting circuit 68, a transformer 70, a pulse generator 72, a rectifying circuit 76, a light coupling device 78, a feedback circuit 80, and a differential amplifier 82.

The voltage converting circuit 68 comprises a bridge circuit 84 and a filter 86 for rectifying the oscillating voltage 62 into a first steady state voltage. The transformer 70 has an input end 88, an output end 90 and a control end 92. The input end 88 is electrically connected to an output end 94 of the voltage converting circuit 68. The transformer 70 is used for transforming the first steady state voltage at the input end 88 into a second oscillating voltage at the output end 90. The control end 92 is used for controlling on and off of the transformer 70. The pulse generator 72 has an output end 96 and a control end 98. The output end 96 is electrically connected to the control end 92 of the transformer 70. The pulse generator 72 is used for generating a pulse signal at the output end 96 so as to control the on and off of the transformer 70. The control end 98 is used to control a duty cycle of the pulse signal. The rectifying circuit 76 comprises a diode 74 electrically connected to the output end 90 of the transformer 70 and a capacitor 75 for rectifying the second oscillating voltage generated by the transformer 70.

The feedback circuit 80 has a first input end 102, a second input end 104, a control end 118 and an output end 106. The first input end 102 is electrically connected to the output end 100 of the rectifying circuit 76. The second input end 104 is electrically connected to the differential amplifier 82. The light coupling device 78 is electrically connected between the output end 106 of the feedback circuit 80 and the control end 98 of the pulse generator 72 for isolating the current between the output end 106 of the feedback circuit 80 and the control end 98 of the pulse generator 72. The differential amplifier 82 has an output end 110 having an output voltage linearly variable with a control voltage inputted from its input end 112.

The feedback circuit 80 further comprises a combining circuit 108 for combining a predetermined multiple of the steady state voltage inputted from the first input end 102 and the output voltage at the output end 110 of the differential amplifier 82 so as to generate a combined voltage at the control end 118, a comparator 114 for comparing the combined voltage with a predetermined voltage to generate a control signal, and a variable resistor 116 electrically connected to the output port 110 of the differential amplifier 82 for fixing errors caused by other resistive components.

When the combined voltage at the control end 118 is higher than the predetermined voltage, the impedance of the comparator 114 will reduce thus turning on the light coupling device 78 and generating an offset voltage at the control end 98 of the pulse generator 72. When detecting the offset voltage, the pulse generator 72 will gradually reduce the duty cycle of the pulse signal. When the combined voltage at the control end 118 is lower than the predetermined voltage, the impedance of the comparator 114 will increase thus turning off the light coupling device 78 and grounding the control end 98 of the pulse generator 72. And the pulse generator 72 will gradually increase the duty cycle of the pulse signal generated at its output end 96.

Because the duty cycle of the pulse signal generated by the pulse generator 72 is indirectly controlled by the steady state voltage at the output port 64 of the power supply 60 and the output voltage at the output end 110 of the differential amplifier 82, and the steady state voltage at the output port 64 is controlled by the duty cycle of the pulse signal, the steady state voltage at the output port 64 is controlled by the output voltage at the output end 110 of the differential amplifier 82. Furthermore, because the output voltage at the output end 110 of the differential amplifier 82 varies with the control voltage inputted at its input end 112, the steady state voltage at the output port 64 of the power supply 60 is controlled by the control voltage. The differential amplifier 82 can be replaced with any controllable voltage source or controllable current source. As long as the voltage or current at the second input end 104 of the feedback circuit 80 is controllable, the steady state voltage at the output port 64 of the power supply 60 can be changed.

Compared with the prior art power supply 10, the power supply 60 comprises a differential amplifier 82, the steady state voltage outputted to the display device 66 through the output port 64 can be changed by controlling the control voltage at the input end 112 of the differential amplifier 82 so that the power supply 60 can generate different steady state voltages for different display devices 66.

Those skilled in the art will readily observe that numerous modifications and alterations of the device may be made while retaining the spirit and scope of the invention. Accordingly, the above disclosure should be construed as limited only by the metes and bounds of the appended claims.

What is claimed is:

1. A power supply for converting an inputted oscillating voltage into an outputted steady state voltage, the power supply comprising:

a voltage converting circuit for converting the inputted oscillating voltage into a first steady state voltage;

a transformer having an input end electrically connected to an output end of the voltage converting circuit for transforming the first steady state voltage into a second oscillating voltage, an output end and a control end for controlling on and off of the transformer;

a pulse generator having an output end electrically connected to the control end of the transformer for generating a pulse signal so as to control the on and off of the transformer, and a control end for controlling a duty cycle of the pulse signal;

a rectifying circuit having an input end electrically connected to the output end of the transformer for rectifying the second oscillating voltage to generate the outputted steady state voltage; and a feedback circuit having a first input end electrically connected to the output end of the rectifying circuit, a second input end electrically connected to a variable power source, and an output end electrically connected to the control end of the pulse generator;

wherein the feedback circuit will control the duty cycle of the pulse signal generated by the pulse generator according to the outputted steady state voltage inputted from the first input end and an output voltage of the variable power source inputted from the second input end so that the outputted steady state voltage generated by the power supply can be controlled by the variable power source connected to the second input end of the feedback circuit.

2. The power supply of claim 1 wherein the voltage converting circuit comprises a bridge circuit and a filter for rectifying the inputted oscillating voltage into the first steady state voltage.

3. The power supply of claim 1 wherein the rectifying circuit comprises a diode electrically connected to the output end of the transformer and a capacitor for rectifying the second oscillating voltage generated by the transformer.

4. The power supply of claim 1 wherein the feedback circuit comprises a combining circuit for combining the steady state voltage inputted from the first input end and the output voltage of the variable power source inputted from the second input end according to a predetermined method to generate a combined voltage, and a comparator for comparing the combined voltage with a predetermined voltage to generate a control signal for controlling the duty cycle of the pulse signal generated by the pulse generator.

5. The power supply of claim 4 further comprising a light coupling device electrically connected between the output end of the feedback circuit and the control end of the pulse generator for isolating the current between the output end of the feedback circuit and the control end of the pulse generator.

6. The power supply of claim 4 wherein the combining circuit combines a predetermined multiple of the steady state voltage inputted from the first input end and the output voltage of the variable power source inputted from the second input end to generate the combined voltage.

7. The power supply of claim 1 wherein the variable power source can be a variable voltage source or a variable current source.

8. The power supply of claim 7 wherein the variable voltage source comprises a differential amplifier for linearly amplifying an inputted control voltage.

9. The power supply of claim 4 wherein when the combined voltage is higher than the predetermined voltage, the comparator will output a positive control signal to the control end of the pulse generator to gradually reduce the duty cycle of the pulse signal, when the combined voltage is lower than the predetermined voltage, the comparator will not output the positive control signal to the control end of the pulse generator, and the pulse generator will gradually increase the duty cycle of the pulse signal.

* * * * *